(12) United States Patent
Tanaka

(10) Patent No.: US 7,290,845 B2
(45) Date of Patent: Nov. 6, 2007

(54) PRINT CONTROL APPARATUS, METHOD, PROGRAM, AND RECORDING MEDIUM

(75) Inventor: Kentaro Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 11/232,034

(22) Filed: Sep. 22, 2005

(65) Prior Publication Data

US 2006/0066927 A1    Mar. 30, 2006

(30) Foreign Application Priority Data

Sep. 24, 2004    (JP)    ............................. 2004-277117

(51) Int. Cl.
B41J 2/205    (2006.01)
(52) U.S. Cl. ......................... 347/15; 347/43; 358/3.06; 358/518
(58) Field of Classification Search .................. 347/15, 347/43; 358/518, 3.06
See application file for complete search history.

(56) References Cited

U.S. PATENT DOCUMENTS 6,637,861 B2 * 10/2003 Yamamoto ................... 347/43
2007/0058211 A1 * 3/2007 Kubota ........................ 358/462

FOREIGN PATENT DOCUMENTS

JP    2003-182120 A    7/2003

* cited by examiner

*Primary Examiner*—Thinh Nguyen
(74) *Attorney, Agent, or Firm*—Sughrue Mion, PLLC

(57) ABSTRACT

A variation in a discharge characteristic among respective nozzles of an inkjet printer is corrected. A color correction table generating section 48, (1) based upon error information (nozzle classes) representing errors of color values of outputs due to errors in ink weights for three types of dots (large, middle, and small) respectively for multiple types of ink colors (CMYK), determines a second correspondence between tone values of color-converted image data and combinations of respective recording ratios of the three types of dots so that the error is approximately zero, and (2) determines combinations of a first tone value and a second tone value so that a total ink discharge quantity according to a first correspondence (SML table recording section 44*a*) of the first tone value representing color-converted image data and a total ink discharge quantity according to a second correspondence of the second tone value representing the color-converted image data are approximately equal. The color correction section 43*b* outputs a first tone value upon image data in CMYK being considered as a second tone value, and provides an SML dot number determining section 44*b* with the output as a tone value of the image data in CMYK.

6 Claims, 11 Drawing Sheets

Inkjet Head 28

| Tone Value | L Dot | M Dot | S Dot |
|---|---|---|---|
| 0 | 0 | 0 | 0 |
| ... | ... | ... | ... |
| 152 | 42 | 51 | 77 |
| ... | ... | ... | ... |
| 166 | 56 | 51 | 77 |
| ... | ... | ... | ... |

|  | L Dot | M Dot | S Dot |
|---|---|---|---|
| Correction Coefficient | 1.1 | 1.2 | 1.3 |

Fig. 8

| Tone Value | L Dot | M Dot | S Dot |
|---|---|---|---|
| 0 | 0 | 0 | 0 |
| ... | ... | ... | ... |
| 152 | 46.2 | 61.2 | 100.1 |
| ... | ... | ... | ... |
| 166 | 61.6 | 61.2 | 100.1 |
| ... | ... | ... | ... |

(a)

| First Tone Value | First Ink Discharge Quantity |
|---|---|
| 0 | 0 |
| ... | ... |
| 152 | 84.000 |
| ... | ... |
| 166 | 98.000 |
| ... | ... |

(b)

| Second Tone Value | Second Ink Discharge Quantity |
|---|---|
| 0 | 0 |
| ... | ... |
| 152 | 98.250 |
| ... | ... |
| 166 | 113.650 |
| ... | ... |

Fig. 10

| Input (Second Tone Value) | Output (First Tone Value) |
|---|---|
| ... | ... |
| 152 | 166 |
| ... | ... |

PRINT CONTROL APPARATUS, METHOD, PROGRAM, AND RECORDING MEDIUM

BACKGROUND OF THE INVENTION

The present invention relates to a correction of a variation in colors printed by a printer including a head of inkjet type.

Among printers of the inkjet type, there are printers including multiple nozzles (ink discharge openings) which discharge ink. The respective nozzles discharge dots in multiple sizes (large, middle, and small) according to voltages supplied to the print head. Although a discharge characteristic of the respective nozzle is almost equal, there is a certain level of variation. This variation causes a variation in colors, and there has thus been practiced to correct the variation of the discharge characteristic of the respective nozzles (refer to Patent Document 1 (Japanese Laid-Open Patent Publication (Kokai) No. 2003-182120)). Specifically, the variation of the discharge characteristic of the respective nozzles is corrected based upon errors between ink weights for the large, middle, and small dots and reference values thereof for the respective nozzles.

For example, it is assumed that a reference value of the ink weight for the middle dot is 20 ng, and the actually obtained ink weight for the middle dot is 17 ng. In this case, it is possible to correct this variation by multiplying a recording ratio of the dot corresponding to a tone value by 20/17=1.18.

However, according to prior art as described above, the maximum value of the recording ratio for the middle dot is also multiplied by 1.18. In general, the recording ratios of the large, middle, and small dots are set to equal to or lower than predetermined respective limit values in order to avoid banding and a degradation of granularity. However, if the maximum value of the recording ratio for the middle dot is multiplied by 1.18, the resulting value exceeds the predetermined limit value. The same applied to the large and small dots.

An object of the present invention is to correct a variation in the discharge characteristic among respective nozzles of an inkjet type printer while the recording ratios of dots are equal to or less than predetermined limit values.

SUMMARY OF THE INVENTION

According to one aspect of the present invention, a print control apparatus that generates print data to be supplied to a print section in order to print with the print section that uses a plurality of types of ink to selectively discharge N (N is an integer number being greater than one) types of ink drops different in the quantity of the ink upon a print medium thereby forming the N types of dots different in the size within an area corresponding to one pixel, includes: a color converting section that generates color-converted image data represented by a plurality of color components available for the print section by converting a color system of a given original image data by means of a color conversion table; a halftone processing section that determines whether the N types of dots are generated for respective pixels based upon a first correspondence between a tone value of the color-converted image data as an input, and a combination of respective recording ratios of the N types of dots as an output; a correspondence determining section that, based upon error information representing an error of a color value of an output due to an error in an ink weight of respective dots of at least one of specific types of the N types of dots for the respective colors of the plurality of types, determines a second correspondence between the tone value of the color-converted image data and a combination of respective recording ratios of the N types of dots such that the error is almost zero; a tone value combination determining section that determines a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and a color correction section that outputs a first tone value if color-converted image data is considered as a second tone value, and supplies the first tone value as a tone value of the color-converted image data to the halftone processing section.

According to the thus constructed print control apparatus, print data to be supplied to a print section is generated in order to print with the print section that uses a plurality of types of ink to selectively discharge N (N is an integer number being greater than one) types of ink drops different in the quantity of the ink upon a print medium thereby forming the N types of dots different in the size within an area corresponding to one pixel.

A color converting section generates color-converted image data represented by a plurality of color components available for the print section by converting a color system of a given original image data by means of a color conversion table.

A halftone processing section determines whether the N types of dots are generated for respective pixels based upon a first correspondence between a tone value of the color-converted image data as an input, and a combination of respective recording ratios of the N types of dots as an output.

Based upon error information representing an error of a color value of an output due to an error in an ink weight of respective dots of at least one of specific types of the N types of dots for the respective colors of the plurality of types, a correspondence determining section determines a second correspondence between the tone value of the color-converted image data and a combination of respective recording ratios of the N types of dots such that the error is almost zero.

A tone value combination determining section determines a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal.

A color correction section outputs a first tone value if color-converted image data is considered as a second tone value, and supplies the first tone value as a tone value of the color-converted image data to the halftone processing section.

According to the present invention, the correspondence determining section may determine the second correspondence by multiplying the respective recording ratios of the N types of dots according to the first correspondence by a predetermined coefficient.

According to the present invention, the total ink discharge quantity may be a sum of recording ratios of the dots obtained by converting the respective recording ratios into those corresponding to a predetermined type of the dot.

According to another aspect of the present invention, a print control method for generating print data to be supplied to a print section in order to print with the print section that uses a plurality of types of ink to selectively discharge N (N is an integer number being greater than one) types of ink drops different in the quantity of the ink upon a print medium thereby forming the N types of dots different in the size within an area corresponding to one pixel, includes: a color converting step of generating color-converted image data represented by a plurality of color components available for the print section by converting a color system of a given original image data by means of a color conversion table; a halftone processing step of determining whether the N types of dots are generated for respective pixels based upon a first correspondence between a tone value of the color-converted image data as an input, and a combination of respective recording ratios of the N types of dots as an output; a correspondence determining step of, based upon error information representing an error of a color value of an output due to an error in an ink weight of respective dots of at least one of specific types of the N types of dots for the respective colors of the plurality of types, determining a second correspondence between the tone value of the color-converted image data and a combination of respective recording ratios of the N types of dots such that the error is almost zero; a tone value combination determining step of determining a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and a color correction of outputting a first tone value if color-converted image data is considered as a second tone value, and supplies the first tone value as a tone value of the color-converted image data of the halftone processing section.

Another aspect of the present invention is a program of instructions for execution by the computer to perform a print control process for generating print data to be supplied to a print section in order to print with the print section that uses a plurality of types of ink to selectively discharge N (N is an integer number being greater than one) types of ink drops different in the quantity of the ink upon a print medium thereby forming the N types of dots different in the size within an area corresponding to one pixel. The print control process includes a color converting step of generating color-converted image data represented by a plurality of color components available for the print section by converting a color system of a given original image data by means of a color conversion table; a halftone processing step of determining whether the N types of dots are generated for respective pixels based upon a first correspondence between a tone value of the color-converted image data as an input, and a combination of respective recording ratios of the N types of dots as an output; a correspondence determining step of, based upon error information representing an error of a color value of an output due to an error in an ink weight of respective dots of at least one of specific types of the N types of dots for the respective colors of the plurality of types, determining a second correspondence between the tone value of the color-converted image data and a combination of respective recording ratios of the N types of dots such that the error is almost zero; a tone value combination determining step of determining a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and a color correction of outputting a first tone value if color-converted image data is considered as a second tone value, and supplies the first tone value as a tone value of the color-converted image data of the halftone processing section.

Another aspect of the present invention is a computer-readable medium having a program of instructions for execution by the computer to perform a print control process for generating print data to be supplied to a print section in order to print with the print section that uses a plurality of types of ink to selectively discharge N (N is an integer number being greater than one) types of ink drops different in the quantity of the ink upon a print medium thereby forming the N types of dots different in the size within an area corresponding to one pixel. The print control process includes a color converting step of generating color-converted image data represented by a plurality of color components available for the print section by converting a color system of a given original image data by means of a color conversion table; a halftone processing step of determining whether the N types of dots are generated for respective pixels based upon a first correspondence between a tone value of the color-converted image data as an input, and a combination of respective recording ratios of the N types of dots as an output; a correspondence determining step of, based upon error information representing an error of a color value of an output due to an error in an ink weight of respective dots of at least one of specific types of the N types of dots for the respective colors of the plurality of types, determining a second correspondence between the tone value of the color-converted image data and a combination of respective recording ratios of the N types of dots such that the error is almost zero; a tone value combination determining step of determining a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and a color correction of outputting a first tone value if color-converted image data is considered as a second tone value, and supplies the first tone value as a tone value of the color-converted image data of the halftone processing section.

BRIEF DESCRIPTION OF THE DRAWINGS

FIG. 8 shows an example of the correction coefficients obtained for the large, middle, and small dots;

FIG. 10 is a table showing the first ink discharge quantities (FIG. 10(a)) and the second ink discharge quantities (FIG. 10(b)); and FIG. 11 is a table showing an example of the recorded contents of the color correction table recording section 43a.

DETAILED DESCRIPTION OF THE PREFERRED EMBODIMENTS

The following section describes an embodiment of the present invention while referring to drawings.

Hardware Construction

Figure 1:
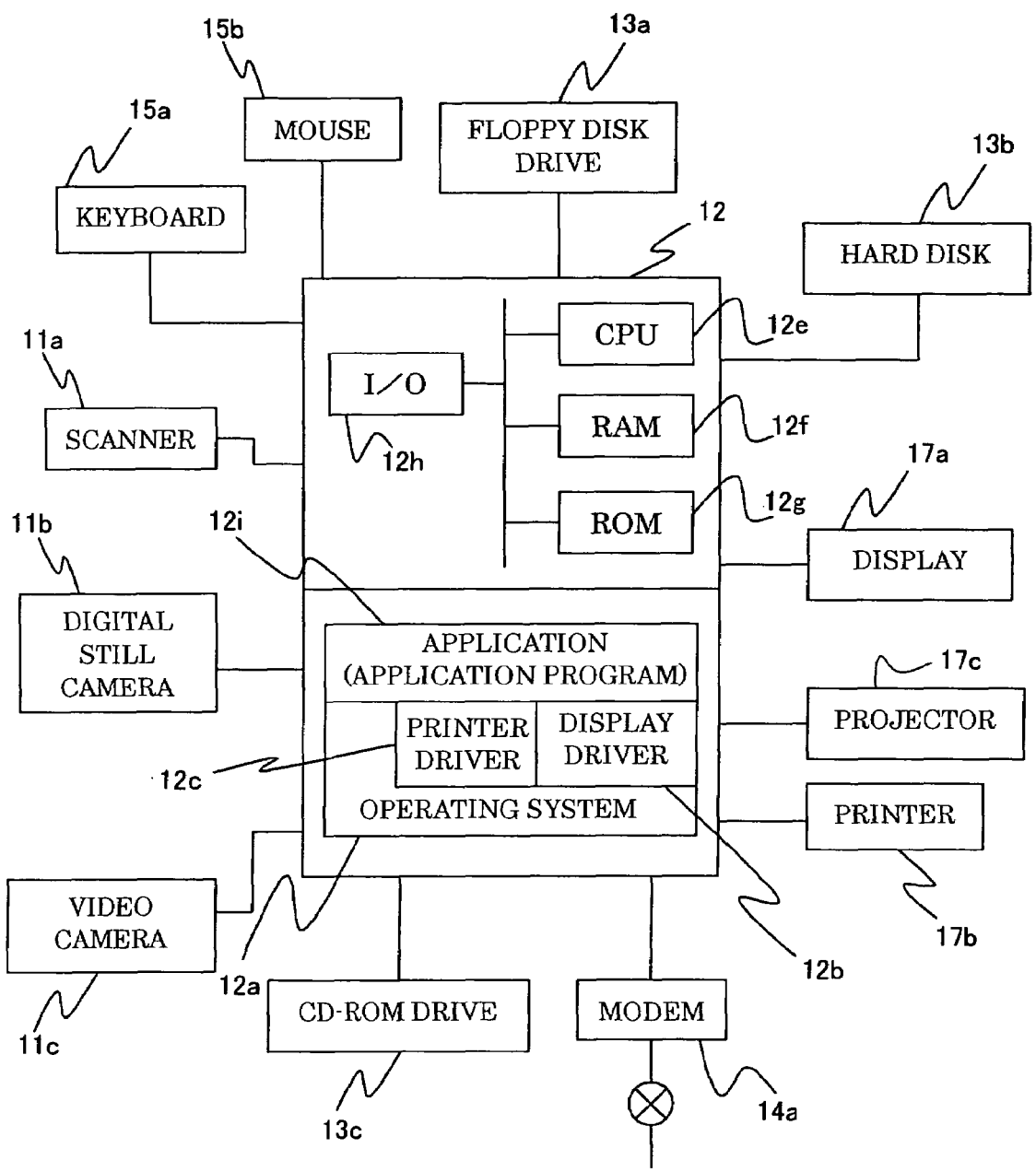
FIG. 1 is a block diagram showing an example of a concrete hardware construction about an image processing device.

FIG. 1 is a block diagram showing an example of a concrete hardware construction about an image processing device.

The present embodiment employs a computer system as an example of hardware for realizing the image processing device. FIG. 1 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16.7 million colors by 256-gradation display in three primary colors comprising R, G, and B.

A floppy (Registered Trademark) disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy (Registered Trademark) disk and a CD-ROM if required. A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a and a color printer 17b as image output devices. The display 17a is provided with a display area comprising 800 pixels in the horizontal direction and 600 pixels in the vertical direction, and 16,7 million colors are displayed on the individual pixels. This resolution is an example, and the resolution may be changed to 640×480 or 1024×768 as needed.

The color printer 17b is an ink jet printer, and prints an image on a print sheet as a medium with color ink of six colors comprising C (Cyan), M (Magenta), Y (Yellow), K (Black), c (Light Cyan) and m (Light Magenta). As its image resolution, high density print such as 360×360 dpi or 720×720 dpi is available, and as its gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base program, and a display driver (DSP DRV) 12b for a display 17a, a printer driver (PRT DRV) 12c for a printer 17b and a projector driver 12d (not shown) for a projector 17c are integrated into the operating system 12a. The drivers 12b, 12c and 12d depend on the models of display 17a, the color printer 17b and the projector 17c, and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12i is executed on the operating system 12a, which serves as the base program. Contents of the processing in application 12i vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12i, and show the processed result as output on the display 17a, the color printer 17b or the projector 17c, which serve as image output devices.

Although in this embodiment the image processor is implemented as a computer system, such a computer system is not always required, but the system to which the image processor is applied may be any other system which requires the image processing of the present invention for the same image data. For example, there may be adopted a system wherein the image processor according to the present invention is built into a digital still camera and printing is performed by a color printer using image data after image processing.

Of course, the present invention is also applicable to various other devices which handle image data, such as color facsimile devices, color copiers, and projectors.

Image Processing Control Program

The image processing control program according to the present invention is usually distributed in a stored state on a recording medium such as a floppy (Registered Trademark) disk or a CD-ROM so that it can be read by the computer 12. The program is read by a media reader (e.g. CD-ROM driver 13c or floppy (Registered Trademark) disk drive 13a) and is installed in the hard disk 13b. Then, a CPU reads a desired program from the hard disk 13b and executes a desired processing. The image processing control program itself according to the present invention also constitutes a part of the present invention.

Configuration of Image Processing Device

Figure 2:
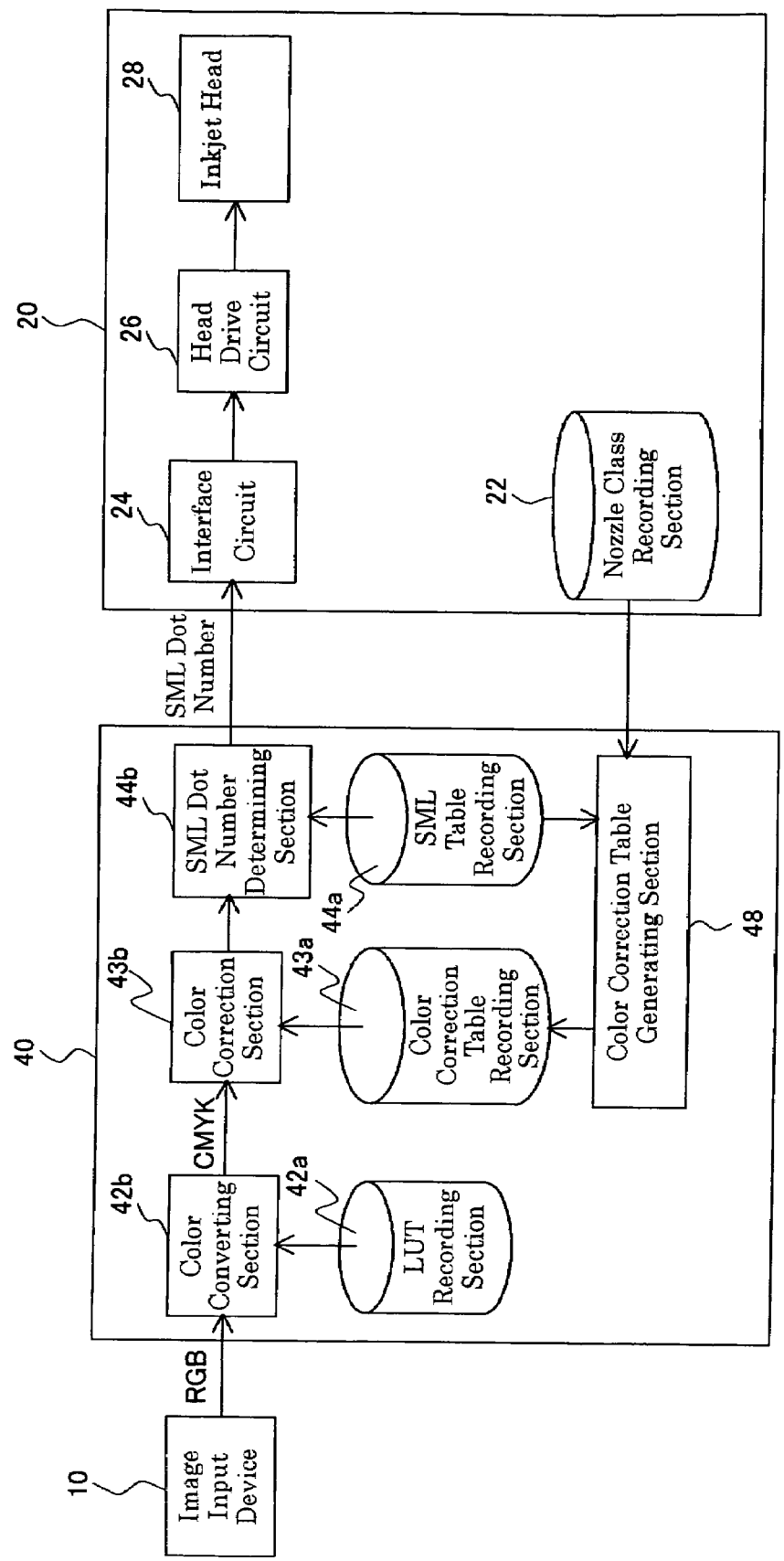
FIG. 2 is a block diagram showing a configuration of an image processing device 40 according to an embodiment of the present invention.

FIG. 2 is a block diagram showing a configuration of an image processing device (corresponding to "print control apparatus") 40 according to an embodiment of the present invention.

Note that the image processing device 40 corresponds to the printer driver (PRT DRV) 12c. An image output device 20 corresponds to the color printer 17b. An image input device 10 corresponds to the scanner 11a, the digital still camera 11b, and the video camera 11c.

The image output device 20 is provided with a nozzle class recording section 22, an interface circuit 24, a head drive circuit 26, and an inkjet head 28.

The interface circuit 24 serves as an interface between the image processing device 40 and the head drive circuit 26.

The head drive circuit 26 receives a value of a voltage to be impressed upon the inkjet head 28 from the image processing device 40 via the interface circuit 24. The head drive circuit 26 then impresses the voltage upon the inkjet head 28.

Figure 3:
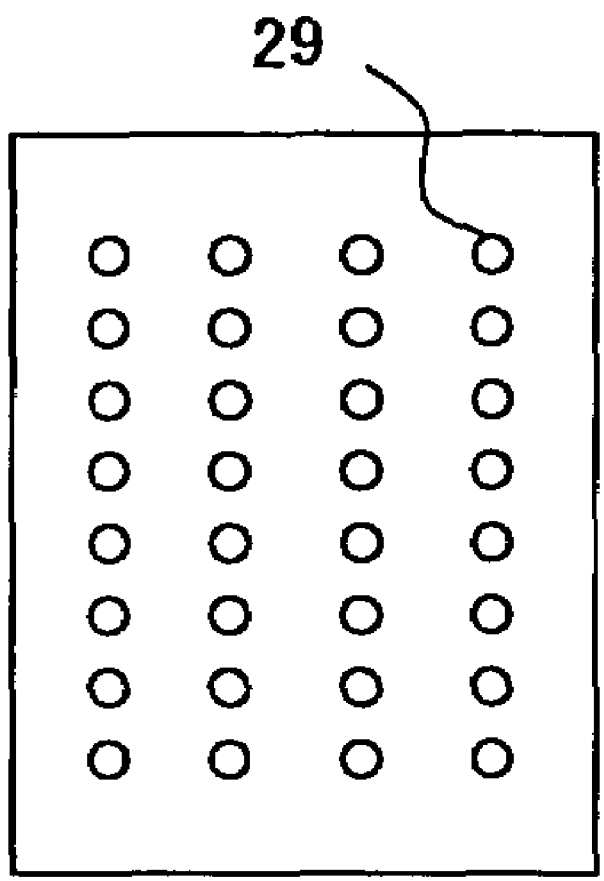
FIG. 3 is a diagram showing an inkjet head 28.

The inkjet head 28 discharges ink according to the impressed voltage. The discharged ink is attached to a medium such as a paper sheet (corresponding to "print medium"), and an image is consequently printed. The inkjet head 28 includes ink discharge openings (nozzles) 29 corresponding to respective colors (CMYK) as shown in FIG. 3.

The inkjet head 28 selects either one of N types (N=3) of ink drops (large, middle, and small) different in the ink quantity for ink for the multiple types of colors (CMYK), and discharges the ink drops upon the print medium. As a result, it is possible to form the three types of dots different in size within an area corresponding to one pixel.

The nozzle class recording section 22 records the nozzle classes (corresponding to "error information") for the ink discharge openings (nozzles) 29 of the inkjet head 28. The nozzle class (ink discharge opening characteristic information) implies a numeric value indicating a difference between a reference ink weight discharged by a reference ink discharge opening serving as a certain reference and an ink weight discharged by the ink discharge opening 29. Note that the difference is represented as a percentage with respect to the reference ink weight. For example, if the ink weight discharged by the ink discharge opening 29 is equal to the reference ink weight, the nozzle class is zero. If the ink weight discharged by the ink discharge opening 29 is heavier than the reference ink weight by 10%, the nozzle class is +10. If the ink weight discharged by the ink discharge opening 29 is lighter than the reference ink weight by 10%, the nozzle class is −10. The nozzle class may be represented as a color value (for example, L*a*b* color system) upon certain ink being printed at a certain dot shot quantity upon a certain medium.

Figure 4:
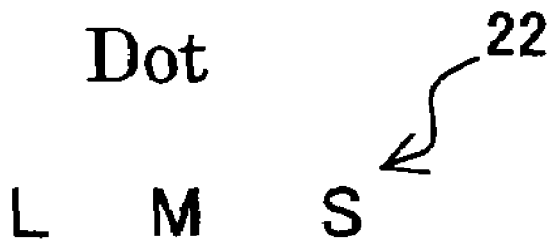
FIG. 4 is a diagram showing an example of the nozzle classes recorded in the nozzle class recording section 22.

FIG. 4 shows an example of the nozzle classes recorded in the nozzle class recording section 22. For example, the nozzle class of the ink discharge opening 29 corresponding to the ink color: C (Cyan), and the dot: large is +10 (larger than the reference ink weight by 10%). Although all the values of the nozzle classes should be zero ideally, they are not zero, and vary due to a manufacturing error and the like.

The image input device 10 supplies the image processing device 40 with the image data represented in RGB.

The image processing device 40 includes an LUT recording section 42a, a color converting section 42b, a color correction table recording section 43a, a color correction section 43b, an SML table recording section 44a, an SML dot number determining section 44b, and a color correction table generating section 48.

The LUT recording section 42a records a color conversion table (LUT: Look Up Table) used to convert the image data represented in R (Red), G (Green), and B (blue) into image data represented in C (Cyan), M (Magenta), Y (Yellow), and K (black).

The color converting section 42b converts the image data in RGB received from the image input device 10 into the image data in CMYK based upon the color conversion table recorded in the LUT recording section 42a. Namely, the color system (RGB) of the original image data received from the image input device 10 is converted by means of the color conversion table into the image data represented in the multiple color components (CMYK) available for the image output device 20.

The SML table recording section 44a records an SML table used to determine recording ratios of the dots in SML (S: Small, M: Middle, and L: large) for tone values in the respective ink colors of the image data in CMYK.

The SML table records a first correspondence between a tone value of the image data in CMYK as an input and a combination of the recording ratios of the respective N=3 types of dots (SML) as an output.

Figure 5:
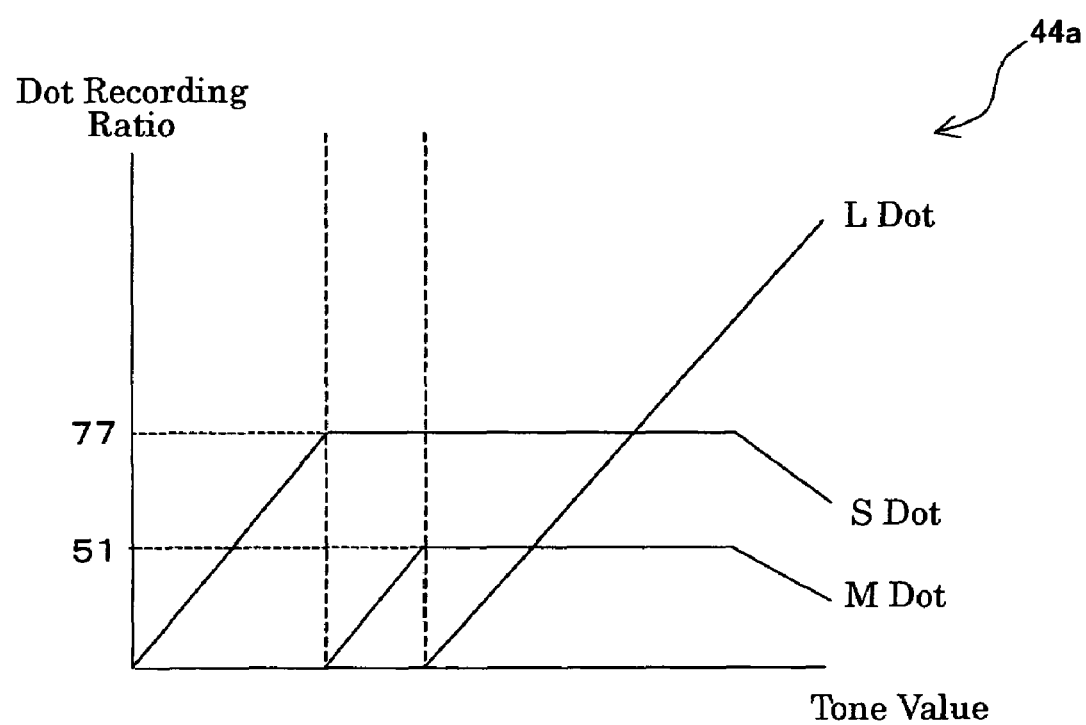
FIG. 5 is a chart showing contents of the SML table.

FIG. 5 is a chart showing contents of the SML table. With reference to FIG. 5, the maximum value of the recording ratio of the small dot is limited to 77, and the maximum value of the recording ratio of the middle dot is limited to 51. With this limit, banding and a degradation of granularity are prevented in a printed image.

Figure 6:
FIG. 6 is a table showing contents of the SML table

FIG. 6 is a table showing contents of the SML table. It specifically shows a part for the input where the recording ratio of the small dot and the recording ratio of the middle dot are limited. If the input (tone value) is present between 152 to 166, the recording ratio of the small dot remains at 77, and the recording ratio of the middle dot remains at 51. However, the recording ratio of the large dot increases from 42 to 56.

The SML dot number determining section (corresponding to a "halftone processing section") 44b determines the recording ratios of the small, middle, and large dots for the tone value of the image data in CMYK based upon the SML table recorded in the SML table recording section 44a.

The SML dot number determining section 44b converts the tone value of the image data in CMYK into any one of N+1=4 tone values ("no formation of dot", "formation of small dot", "formation of middle dot", and "formation of large dot") for respective pixel.

Figure 7:
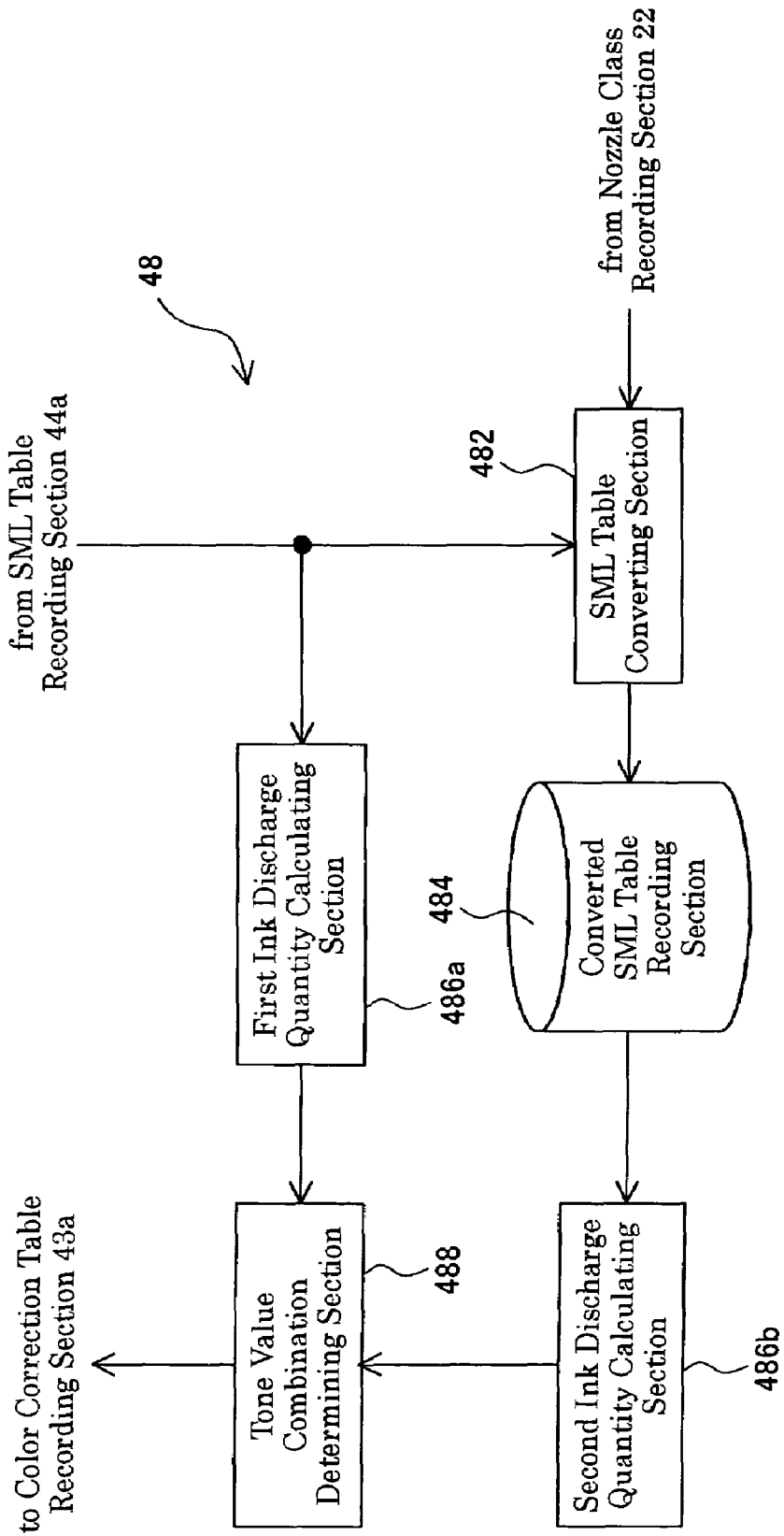
FIG. 7 is a block diagram showing a configuration of the color correction table generating section 48.

FIG. 7 is a block diagram showing a configuration of the color correction table generating section 48. The color correction table generating section 48 generates the color correction table recorded in the color correction table recording section 43a. The color correction table generating section 48 includes an SML table converting section 482, a converted SML table recording section 484, a first ink discharge quantity calculating section 486a, a second ink discharge quantity calculating section 486b, and a tone value combination determining section 488.

The SML table converting section (correspondence determining section) 482 receives the nozzle classes from the nozzle class recording section 22. The SML table converting section 482 obtains correction coefficients based upon the nozzle classes. The SML table converting section 482 reads out the recorded contents of the SML table recording section 44a, and obtains a second correspondence by multiplying the respective recording ratios of the N=3 types of dots (large, middle, and small) according to the first correspondence by the correction coefficients.

Namely, it is assumed that the nozzle class of the large dot of a certain color is −9. It implies that there is discharged a weight of only 100−9=91% of the reference value for the large dot. In order to reproduce a color value equal to the nozzle class 0 of the reference value, the ink weight to be discharged is compensated by the dot number for the respective nozzle class. The correction coefficient is a ratio used to increase/decrease the dot number to attain the color value equal to that of the nozzle class 0. The correction coefficients are provided for the respective ink colors and the respective dot sizes. In this case, it is necessary to multiply the dot number by 1.1. As a result, the error with respect to the reference value can be almost zero. The description "almost zero" implies that the error can be considered as almost zero. FIG. 8 shows an example of the correction coefficients obtained for the large, middle, and small dots. In the example shown in FIG. 8, the correction coefficients exceed one for any of the large, middle, and small dots. It implies that only weights of ink less than the respective reference values are discharged for any of the large, middle, and small dots.

Figure 9:
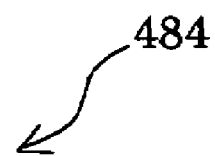
FIG. 9 shows an example of the recorded contents of the converted SML table recording section 484.

The converted SML table recording section 484 receives and records the second correspondence from the SML table converting section 482. FIG. 9 shows an example of the recorded contents of the converted SML table recording section 484. The example shown in FIG. 9 corresponds to FIG. 6 and FIG. 8. For example, if the input (tone value) is 152, the recording ratio of the small dot is 77, the recording ratio of the middle dot is 51, and the recording ratio of the large dot is 42. Then, the recording ratio of the small dot is converted to 77×1.3=100.1, the recording ratio of the middle dot is converted to 51×1.2=61.2, and the recording ratio of the large dot is converted to 42×1.1=46.2. As a result, the second correspondence (converted SML table) can be obtained as shown in FIG. 9.

The first ink discharge quantity calculating section 486a obtains a total ink discharge quantity (first ink discharge quantity) based upon the SML table recorded in the SML table recording section 44a. The first ink discharge quantity is a sum of dot recording ratios obtained by converting the respective recording ratios into those corresponding to the large dot. For example, it is assumed that the reference value of the large dot is 14 ng, the reference value of the middle dot is 7 ng, and the reference value of the small dot is 3 ng. Under this condition, a first ink discharge quantity is obtained upon the input (tone value) being 152. The recording ratio of the small dot 77 converted into that of the large dot is 77×3/14, the recording ratio of the middle dot 51 converted into that of the large dot is 51×7/14, and the recording ratio of the large dot remains to 42. Consequently, the sum of them is obtained as 77×3/14+51×7/14+42=84.000.

The second ink discharge quantity calculating section 486b obtains the total ink discharge quantity (second ink discharge quantity) based upon the converted SML table recorded in the converted SML table recording section 484. The second ink discharge quantity is a sum of dot recording ratios obtained by converting the respective recording ratios into those corresponding to the large dot. For example, it is assumed that the reference value of the large dot is 14 ng, the reference value of the middle dot is 7 ng, and the reference value of the small dot is 3 ng. Under this condition, a second ink discharge quantity is obtained if the input (tone value) is 152. The recording ratio of the small dot 100.1 converted into that of the large dot is 100.1×3/14, the recording ratio of the middle dot 61.2 converted into that of the large dot is 61.2×7/14, and the recording ratio of the large dot remains to 46.2. Consequently, the sum of them is obtained as 100.1×3/14+61.2×7/14+46.2=98.250.

FIG. 10 is a table showing the first ink discharge quantities (FIG. 10(a)) and the second ink discharge quantities (FIG. 10(b)).

The tone value combination determining section 488 determines a combination of a first tone value and a second tone value such that a total ink discharge quantity (first ink discharge quantity) according to the first correspondence upon color-converted image data being considered as the first tone value, and a total ink discharge quantity (second ink discharge quantity) according to the second correspondence upon color-converted image data being considered as the second tone value are approximately equal.

A description will be given with reference to FIG. 10. First, the first ink discharge quantity is 98.000 for the first tone value 166 (refer to FIG. 10(a)). Then, the second ink discharge quantity is 98.250 for the second tone value 152 (refer to FIG. 10(b)). The first ink discharge quantity and the second ink discharge quantity are approximately equal in this case. The first tone value 166 and the second tone value 152 are thus combined. Note that a second ink discharge quantity "approximately equal" to a certain first ink discharge quantity implies a second ink discharge quantity closest to the certain first ink discharge quantity.

The thus determined combinations of the first tone value and the second tone value are written into the color correction table recording section 43a.

Figure 11:

The color correction table recording section 43a records the combinations of the first tone value and the second tone value output from the tone value combination determining section 488. FIG. 11 is a table showing an example of the recorded contents of the color correction table recording section 43a. The combination of the first tone value 166 and the second tone value 152 is recorded.

The color correction section 43b receives the color-converted image data (image data in CMYK) from the color converting section 42b. The color correction section 43b outputs a first tone value upon the color-converted image data being considered as a second tone value, and provides the SML dot number determining section 44b with the output as the tone value of the color-converted image data. For example, it is assumed that a tone value 152 is supplied to the color correction section 43b from the color converting section 42b. Since the first tone value corresponding to the second tone value 152 is 166, the color correction section 43b supplies the SML dot number determining section 44b with the tone value 166 representing the color-converted image data.

A description will now be given of an operation of the embodiment of the present invention.

Before image data represented in RGB is provided from the image input device 10 to the image processing device 40, the color correction table is generated by the color correction table generating section 48, and is then recorded in the color correction table recording section 43a.

The SML table converting section 482 receives the nozzle classes from the nozzle class recording section 22, and reads out the SML table from the SML table recording section 44a. The SML table converting section 482 then defines the correction coefficients based upon the nozzle classes, and respectively multiplies the recording ratios of the dots recorded in the SML table by the correction coefficients. The second correspondence obtained in this way is recorded in the converted SML table recording section 484.

The first ink discharge quantity calculating section 486a obtains total ink discharge quantities (first ink discharge quantities) based upon the SML table recorded in the SML table recording section 44a (refer to FIG. 10(a)).

The second ink discharge quantity calculating section 486b obtains total ink discharge quantities (second ink discharge quantities) based upon the converted SML table recorded in the converted SML table recording section 484 (refer to FIG. 10(b)).

The tone value combination determining section 488 determines combinations of a first tone value and a second tone value such that a first ink discharge quantity and a second ink discharge quantity are almost equal. For example, the first tone value 166 (first ink discharge quantity is 98.000) and the second tone value 152 (second ink discharge quantity is 98.250) are combined.

Combinations determined in this way are recorded as the color correction table in the color correction table recording section 43*a*.

The image data in RGB is then provided from the image input device 10 to the image processing device 40. The image data in RGB is supplied to the color converting section 42*b*. The color converting section 42*b* converts the image data in RGB received from the image input device 10 into image data in CMYK based upon the color conversion table recorded in the LUT recording section 42*a*.

The image data in CMYK (such as the tone value 152) is supplied to the color correction section 43*b*. The color correction section 43*b* outputs a first tone value while the image data in CMYK is considered as a second tone value, and provides the SML dot number determining section 44*b* with the output as a tone value (such as the tone value 166) of the color-converted image data.

The SML dot number determining section 44*b* determines recording ratios of the small, middle, and large dots for the tone value of the image data in CMYK received from the color correction section 43*b* based upon the SML table recorded in the SML table recording section 44*a*.

The determination result of the SML dot number determining section 44*b* is supplied to the image output device 20. The determination result is supplied to the head drive circuit 26 via the interface circuit 24. The head drive circuit 26 impresses a voltage upon the inkjet head 28 according to the determination result of the SML dot number determining section 44*b*. The inkjet head 28 discharges the ink according to the impressed voltage. The discharged ink is attached to a medium such as a paper sheet, thereby attaining printing.

If the tone value 152 (total ink discharge quantity 84.000) (refer to FIG. 10(*a*)) is simply supplied to the SML dot number determining section 44*b*, since the ink with a weight lower than the reference value is discharged for all the large, middle, and small dots (refer to FIG. 8), the image to be printed becomes lighter in color than the tone value 152.

If the SML table (refer to FIG. 6) recorded in the SML table recording section 44*a* is changed to the converted SML table (refer to FIG. 9), the total ink discharge quantity is 98.250 for the tone value 152 (refer to FIG. 10(*b*)). Since the total ink discharge quantity increases compared with the total ink discharge quantity 84.000 in the case where the SML dot number determining section 44*b* refers to the SML table, the printed image becomes darker, and the image corresponding to the tone value 152 is obtained.

However, if the SML dot number determining section 44*b* refers to the converted SML table, the recording ratio of the small dot 100.1 exceeds the limit value 77, and the recording ratio of the middle dot 61.2 exceeds the limit value 51. As a result, banding and a degradation of granularity will occur in the printed image.

However, the SML dot number determining section 44*b* actually refers to the SML table (refer to FIG. 6). Moreover, the tone value 166 in place of the tone value 152 is supplied to the SML dot number determining section 44*b*. As a result, the first ink discharge quantity corresponding to the tone value 166 is 98.000 (refer to FIG. 10(*a*)). This is almost equal to the second ink discharge quantity 98.250 corresponding to the tone value 152 (refer to FIG. 10(*b*)). Since the first ink discharge quantity increases compared with the first ink discharge quantity 84.000 (tone value 152) in the case where the SML dot number determining section 44*b* refers to the SML table, the printed image becomes darker, and the image corresponding to the tone value 152 is obtained.

Moreover, at the tone level 166 upon the SML table, the recording ratio 77 of the small dot is equal to or lower than the limit value 77, and the recording ratio 51 of the middle dot is equal to or lower than the limit value 51. As a result, the banding and degradation of granularity are prevented in the printed image.

Namely, according to the embodiment of the present invention, it is possible to correct a variation in the discharge characteristic among respective nozzles of an inkjet type printer while recording ratios of dots are respectively equal to or lower than limit values.

What is claimed is:

1. A print control apparatus that generates print data to be supplied to a print section in order to print with said print section that uses a plurality of types of ink to selectively discharge N (N is an integer number being greater than one) types of ink drops different in the quantity of the ink upon a print medium thereby forming the N types of dots different in the size within an area corresponding to one pixel, comprising:

a color converting section that generates color-converted image data represented by a plurality of color components available for said print section by converting a color system of a given original image data by means of a color conversion table;

a halftone processing section that determines whether the N types of dots are generated for respective pixels based upon a first correspondence between a tone value of the color-converted image data as an input, and a combination of respective recording ratios of the N types of dots as an output;

a correspondence determining section that, based upon error information representing an error of a color value of an output due to an error in an ink weight of respective dots of at least one of specific types of the N types of dots for the respective colors of the plurality of types, determines a second correspondence between the tone value of the color-converted image data and a combination of respective recording ratios of the N types of dots such that the error is almost zero;

a tone value combination determining section that determines a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and a color correction section that outputs a first tone value if color-converted image data is considered as a second tone value, and supplies the first tone value as a tone value of the color-converted image data to said halftone processing section.

2. The print control apparatus according to claim 1, wherein:

said correspondence determining section determines the second correspondence by multiplying the respective recording ratios of the N types of dots according to the first correspondence by a predetermined coefficient.

3. The print control apparatus according to claim 1, wherein:

the total ink discharge quantity is a sum of recording ratios of the dots obtained by converting the respective recording ratios into those corresponding to a predetermined type of the dot.

4. A print control method for generating print data to be supplied to a print section in order to print with said print section that uses a plurality of types of ink to selectively discharge N (N is an integer number being greater than one) types of ink drops different in the quantity of the ink upon a print medium thereby forming the N types of dots different in the size within an area corresponding to one pixel, comprising:
- a color converting step of generating color-converted image data represented by a plurality of color components available for said print section by converting a color system of a given original image data by means of a color conversion table;
- a halftone processing step of determining whether the N types of dots are generated for respective pixels based upon a first correspondence between a tone value of the color-converted image data as an input, and a combination of respective recording ratios of the N types of dots as an output;
- a correspondence determining step of, based upon error information representing an error of a color value of an output due to an error in an ink weight of respective dots of at least one of specific types of the N types of dots for the respective colors of the plurality of types, determining a second correspondence between the tone value of the color-converted image data and a combination of respective recording ratios of the N types of dots such that the error is almost zero;
- a tone value combination determining step of determining a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and
- a color correction of outputting a first tone value if color-converted image data is considered as a second tone value, and supplies the first tone value as a tone value of the color-converted image data of said halftone processing section.

5. A program of instructions for execution by the computer to perform a print control process for generating print data to be supplied to a print section in order to print with said print section that uses a plurality of types of ink to selectively discharge N (N is an integer number being greater than one) types of ink drops different in the quantity of the ink upon a print medium thereby forming the N types of dots different in the size within an area corresponding to one pixel, said print control process comprising:
- a color converting step of generating color-converted image data represented by a plurality of color components available for said print section by converting a color system of a given original image data by means of a color conversion table;
- a halftone processing step of determining whether the N types of dots are generated for respective pixels based upon a first correspondence between a tone value of the color-converted image data as an input, and a combination of respective recording ratios of the N types of dots as an output;
- a correspondence determining step of, based upon error information representing an error of a color value of an output due to an error in an ink weight of respective dots of at least one of specific types of the N types of dots for the respective colors of the plurality of types, determining a second correspondence between the tone value of the color-converted image data and a combination of respective recording ratios of the N types of dots such that the error is almost zero;
- a tone value combination determining step of determining a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and
- a color correction of outputting a first tone value if color-converted image data is considered as a second tone value, and supplies the first tone value as a tone value of the color-converted image data of said halftone processing section.

6. A computer-readable medium having a program of instructions for execution by the computer to perform a print control process for generating print data to be supplied to a print section in order to print with said print section that uses a plurality of types of ink to selectively discharge N (N is an integer number being greater than one) types of ink drops different in the quantity of the ink upon a print medium thereby forming the N types of dots different in the size within an area corresponding to one pixel, said print control process comprising:
- a color converting step of generating color-converted image data represented by a plurality of color components available for said print section by converting a color system of a given original image data by means of a color conversion table;
- a halftone processing step of determining whether the N types of dots are generated for respective pixels based upon a first correspondence between a tone value of the color-converted image data as an input, and a combination of respective recording ratios of the N types of dots as an output;
- a correspondence determining step of, based upon error information representing an error of a color value of an output due to an error in an ink weight of respective dots of at least one of specific types of the N types of dots for the respective colors of the plurality of types, determining a second correspondence between the tone value of the color-converted image data and a combination of respective recording ratios of the N types of dots such that the error is almost zero;
- a tone value combination determining step of determining a combination of a first tone value and a second tone value such that a total ink discharge quantity according to the first correspondence upon a color-converted image data being considered as the first tone value, and a total ink discharge quantity according to the second correspondence upon the color-converted image data being considered as the second tone value are approximately equal; and
- a color correction of outputting a first tone value if color-converted image data is considered as a second tone value, and supplies the first tone value as a tone value of the color-converted image data of said halftone processing section.

* * * * *